United States Patent [19]

Karnbach et al.

[11] Patent Number: 5,710,402

[45] Date of Patent: Jan. 20, 1998

[54] ARC-RESISTANT SWITCHGEAR ENCLOSURE EMPLOYING A TOGGLE FLAP VENTING SYSTEM

[75] Inventors: Robert S. Karnbach, Lake Mary; David S. Komives, Apopka, both of Fla.; Leo E. Blom, Murfreesboro, Tenn.

[73] Assignee: ABB Power T&D Company Inc., Raleigh, N.C.

[21] Appl. No.: 688,504

[22] Filed: Jul. 30, 1996

[51] Int. Cl.⁶ .............................. H01H 33/53; H02B 1/56
[52] U.S. Cl. ................................ 218/157; 361/676
[58] Field of Search .......................... 200/289, 304–306; 218/155–158; 361/603–625, 676–678

[56] References Cited

U.S. PATENT DOCUMENTS

| | | | |
|---|---|---|---|
| 4,118,755 | 10/1978 | Davies et al. | 361/678 |
| 4,464,703 | 8/1984 | Davies et al. | 200/50.23 |
| 4,528,614 | 7/1985 | Shariff et al. | 361/678 |
| 5,124,881 | 6/1992 | Motoki | 361/605 |
| 5,193,049 | 3/1993 | Jackson | 361/676 |
| 5,457,296 | 10/1995 | Neill et al. | 200/306 |
| 5,569,894 | 10/1996 | Uchida et al. | 218/157 X |
| 5,574,624 | 11/1996 | Rennie et al. | 218/157 X |
| 5,589,672 | 12/1996 | Uchida et al. | 218/157 X |

FOREIGN PATENT DOCUMENTS

| | | |
|---|---|---|
| 1048626 | 1/1959 | Germany . |
| 1188170 | 3/1975 | Germany . |
| 3013756 | 10/1981 | Germany . |
| 2252671 | 12/1992 | United Kingdom ......... H01H 33/575 |

OTHER PUBLICATIONS

Edward W. Kalkstein et al., "The Safety Benefits of Arc Resistant Metalclad Medium Voltage Switchgear, "94–CH3451–2/94/0000–0309, 1994 IEEE.

"Procedure for Testing the Resistance of Metalclad Switchgear Under Conditions of Arcing Due to Conditions of Internal Fault,"EEMAC Standard G14–1, 1987.

Paul Thompson et al., "Improved Switchgear Safety Through Arc–Resistant Construction,"1994 Electric Utility Conference, vol. IX.

*Primary Examiner*—J. R. Scott
*Attorney, Agent, or Firm*—Woodcock Washburn Kurtz Mackiewicz & Norris LLP

[57] ABSTRACT

An arc resistant enclosure including two compartments having a toggle flap which permits the two compartments to share a single exit path from the enclosure for any pressure and gases produced in either compartment.

7 Claims, 2 Drawing Sheets

ARC-RESISTANT SWITCHGEAR ENCLOSURE EMPLOYING A TOGGLE FLAP VENTING SYSTEM

Cross Reference to Related Applications

The subject matter disclosed in this specification is related to the subject matter disclosed in co-pending application Ser. No. 08/538,448, filed Oct. 3, 1995 now U.S. Pat. No. 5,574,624 and co-pending application Ser. No. 08/538,746, filed Oct. 3, 1995.

FIELD OF THE INVENTION

The present invention relates generally to the field of electrical power distribution equipment, such as medium voltage switchgear, and more particularly to an arc-resistant switchgear enclosure employing a toggle flap venting system.

BACKGROUND OF THE INVENTION

Arc-resistant switchgear enclosures must be designed to withstand the pressures and temperatures of gases associated with an internal arcing fault. Such enclosures are designed to direct pressure and hot arc gases away from personnel and to thereby enhance safety. A commonly employed method of improving switchgear safety through arc-resistant construction is to provide a direct, vertical exhaust vent from each compartment to the top of the switchgear enclosure. A problem with this practice is that it precludes the use of vertically stacked arrangements (e.g., 2-high breaker enclosures, 1-high breaker with voltage transformer drawers, etc.), which are commonly employed in the North American switchgear market. This limitation, i.e., the preclusion of the use of vertically stacked arrangements, limits the commercial acceptance of existing arc-resistant construction in the United States.

Other prior art switchgear designs have employed external arc chambers. A problem with external arc chambers is that they limit the number and type of the switchgear configurations that may be deployed within a given volume.

In addition, certain classes of arc-resistant switchgear also require that the pressure and hot arc gases not enter any adjacent enclosures or compartments.

Further background information relating to the present invention can be found in the following publications:

"The Safety Benefits of Arc Resistant Metalclad Medium Voltage Switchgear," 94-CH3451-2/94/0000-0309, 1994 IEEE;

"Procedure for Testing the Resistance of Metalclad Switchgear Under Conditions of Arcing Due to Conditions of internal Fault," EEMAC Standard G14-1 , 1987 (this is the test standard used in North America; ANSI does not presently address this issue, although an ANSI working committee has been established); and "Improved Switchgear Safety Through Arc-Resistant Construction," by Paul Thompson and E. John Saleeby, 1994 (presented at the 1994 Electric Utility Conference).

SUMMARY OF THE INVENTION

These problems and difficulties of prior art switchgear designs are addressed by the arc resistant enclosure in accordance with the present invention. Briefly, and in accordance with the invention, an arc resistant enclosure is provided. The arc resistant enclosure comprises first and second compartments for housing electrical components. Each of the first and second compartments house one or more of the electrical components. The first compartment has an aperture for permitting pressure and gases to exit from it and vent from the arc resistant enclosure.

The second compartment has an aperture for permitting pressure and gases to flow from it into the first compartment and has a toggle flap for covering the aperture in the second compartment.

The toggle flap is movable from a first position covering the aperture in the second compartment to a second position within the first compartment in which it forces any pressure and gases exiting the second compartment to exit through the aperture in the first compartment.

The arc resistant enclosure incorporating the toggle flap saves space by permitting two separate compartments to share a single exit path.

Other features of the present invention are described below.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
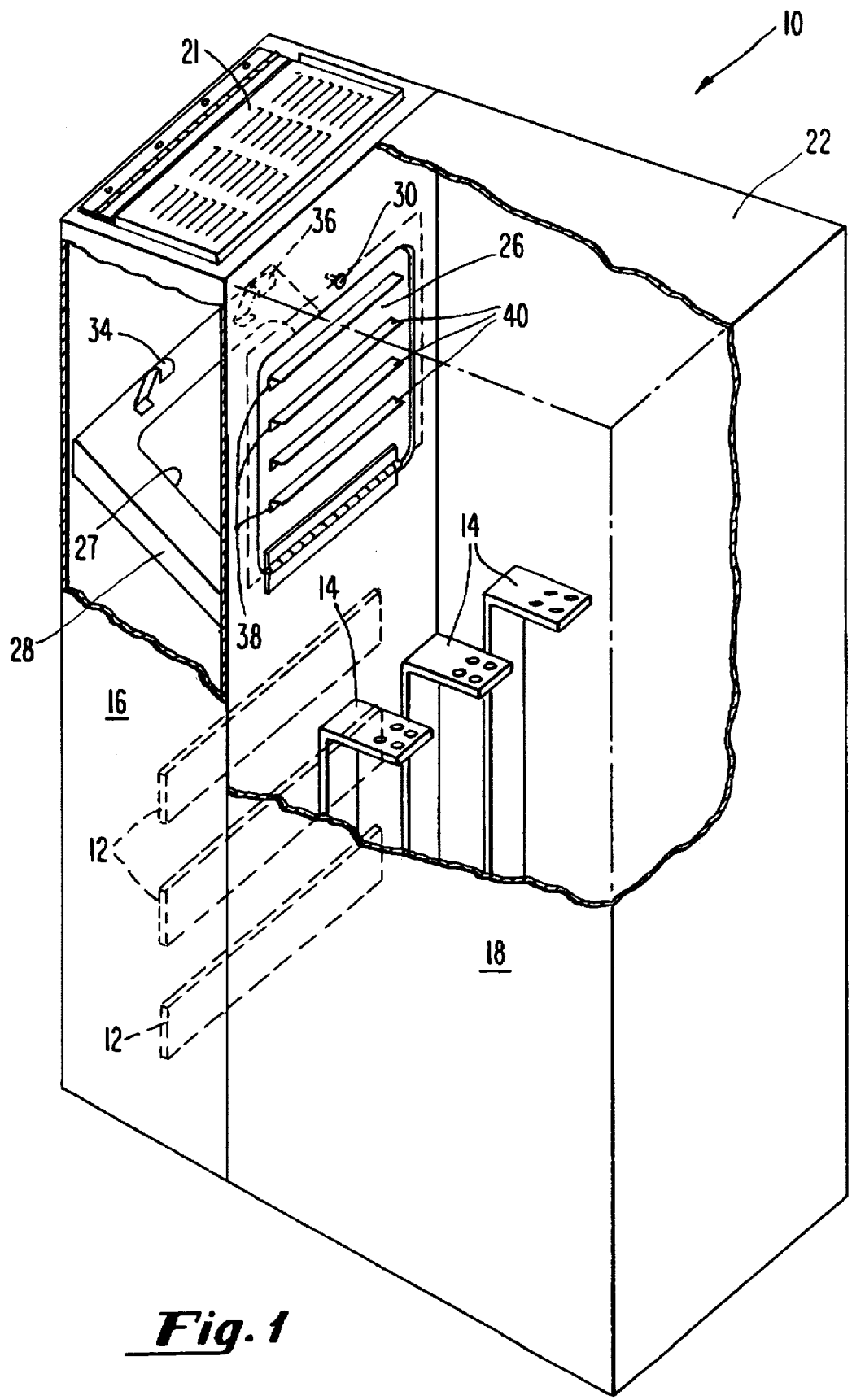
FIG. 1 is a diagrammatic isometric view of an arc resistant enclosure for electrical components employing a toggle flap venting system in accordance with the invention and illustrating toggle flap in a first position.
Figure 2:
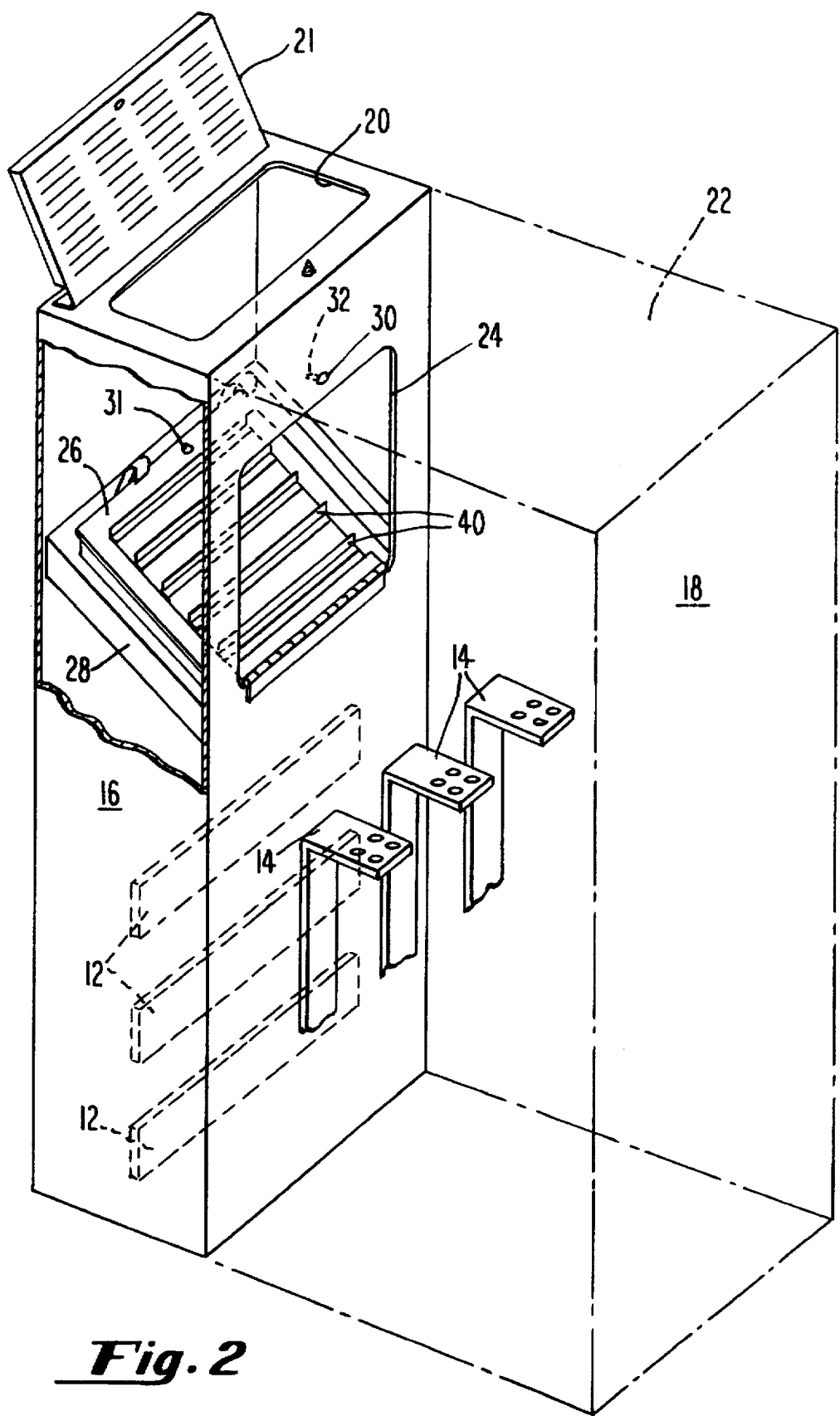
FIG. 2 is a view similar to FIG. 1 but illustrating toggle flap in a second position.

Referring now to the drawings wherein like reference numerals refer to like parts throughout the several views, FIGS. 1 and 2 depict a diagrammatic isometric view of an arc resistant enclosure 10 for housing electrical components.

The electrical components housed within the enclosure 10 may, for example, comprise a main bus assembly 12 and power cable connections 14. Of course it will be recognized by those skilled in the art that other types of electrical components may be housed within enclosure 10, as for example, circuit breakers, power transformers, etc.

The component 12 is housed in a first or forward compartment 16 and the component 14 is housed in a second or rear compartment 18. The first compartment 16 has an aperture 20 and a hinged cover or flap 21 disposed over the aperture 20 and which flap when opened permits pressure and gases to flow from compartment 16 and vent from compartment 16 and thus from the enclosure 10. The second compartment 18 has a closed top surface 22 and an aperture 24, as best seen in FIG. 2, for permitting pressure and gas to flow therefrom into the compartment 16. The second compartment 18 also has a hinged toggle flap 26 for covering the aperture 24 of the second compartment; the toggle flap 26 is shown in the closed position in FIG. 1 and in the open position in FIG. 2 and abutting the seat 28 disposed in the upper portion of compartment 16. As best seen in FIG. 1, the seat 28 has an opening 27 therethrough. The function of this opening 29 will be described below.

In operation, the arrangement is such that pressure and hot gases produced within compartment 18 upon the occurrence of an electrical arc fault within compartment 18 will force the toggle flap 26 to move from the first or aperture covering position shown in FIG. 1 to the second position against the seat 28 and within the compartment 16 (shown in FIG. 2) thereby forcing any pressure and gases exiting through the aperture 24 of the second compartment 18 to flow into the first compartment 16, force hinged flap 21 to open and permit such pressure and gases to exit through the aperture 20 of compartment 16.

If, however, an electrical arc fault occurs with compartment 16, the pressure and hot gases will pass through the opening 27 of seat 28 and, with the toggle flap 26 in its first or aperture covering position shown in FIG. 1, will be prevented from entering compartment 18 and will therefore exit the enclosure 10 by forcing open the flap 21 and be released from the top of the enclosure 10 through the aperture 20.

Also, shown in FIGS. 1 and 2 are holding means comprising a plastic friction catch 30 and a cooperating opening 31 in hinged toggle flap 26. When the toggle flap 26 is in the position shown in FIG. 1, the terminal portion or distal end 32 of the plastic friction catch 30 is located in the opening 31 and because of the frictional fit therebetween, the flap 26 is releasably held in the first or closed position shown in FIG. 1.

There is also shown in FIGS. 1 and 2 a pair of retaining means or spring catches 34 and 36 mounted on seat 28. These spring catches retain or hold the toggle flap 26 in the second position (shown in FIG. 2) when the toggle moves to this second position.

As best seen in FIG. 1, the toggle flap 26 has a series of stiffeners 38 comprised of formed sheet metal. These stiffeners 38 stiffen and maintain the toggle flap 26 rigid. The stiffeners 38 include sail means 40 for catching pressure and gases to propel toggle flap from the first position (FIG. 1) to the second position (FIG. 2).

In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. An arc resistant enclosure for electrical components comprising:

first and second compartments for housing said electrical components, each of said first and second compartments housing one or more of said electrical components, said first compartment having an aperture for permitting pressure and gases to flow therefrom and vent from said arc resistant enclosure;

said second compartment having an aperture for permitting pressure and gases to flow therefrom into said first compartment and having a toggle flap for covering said aperture in said second compartment;

said toggle flap being movable from a first position covering said aperture of said second compartment to a second position within said first compartment in which it forces any pressure and gases exiting said second compartment to exit through the aperture of said first compartment.

2. An arc resistant enclosure as recited in claim 1 wherein said first compartment includes a seat for receiving said toggle flap when said toggle flap moves to said second position.

3. An arc resistant enclosure as recited in claim 2 wherein said seat has an opening therethrough which permits pressure and gases to flow from within said first component and exit through the aperture of said first compartment.

4. An arc resistant enclosure as recited in claim 1 further comprising holding means for releasably holding said toggle flap in said first position.

5. An arc resistant enclosure as recited in claim 1 wherein said first compartment includes retaining means for retaining said toggle flap in said second position when said toggle flap moves to said second position.

6. An arc resistant enclosure as recited in claim 1 wherein said toggle flap has stiffening means for stiffening and maintaining said toggle flap rigid.

7. An arc resistant enclosure as recited in claim 6 wherein said stiffening means include sail means for catching pressure and gases to propel said toggle flap from said first position to said second position.

* * * * *